C. R. RANEY.
SHOCKING MACHINE.
APPLICATION FILED JAN. 23, 1913.

1,231,195.

Patented June 26, 1917.
3 SHEETS—SHEET 1.

Witnesses:
Inventor.
Clemma R. Raney,
By Chas. E. Lord
Atty.

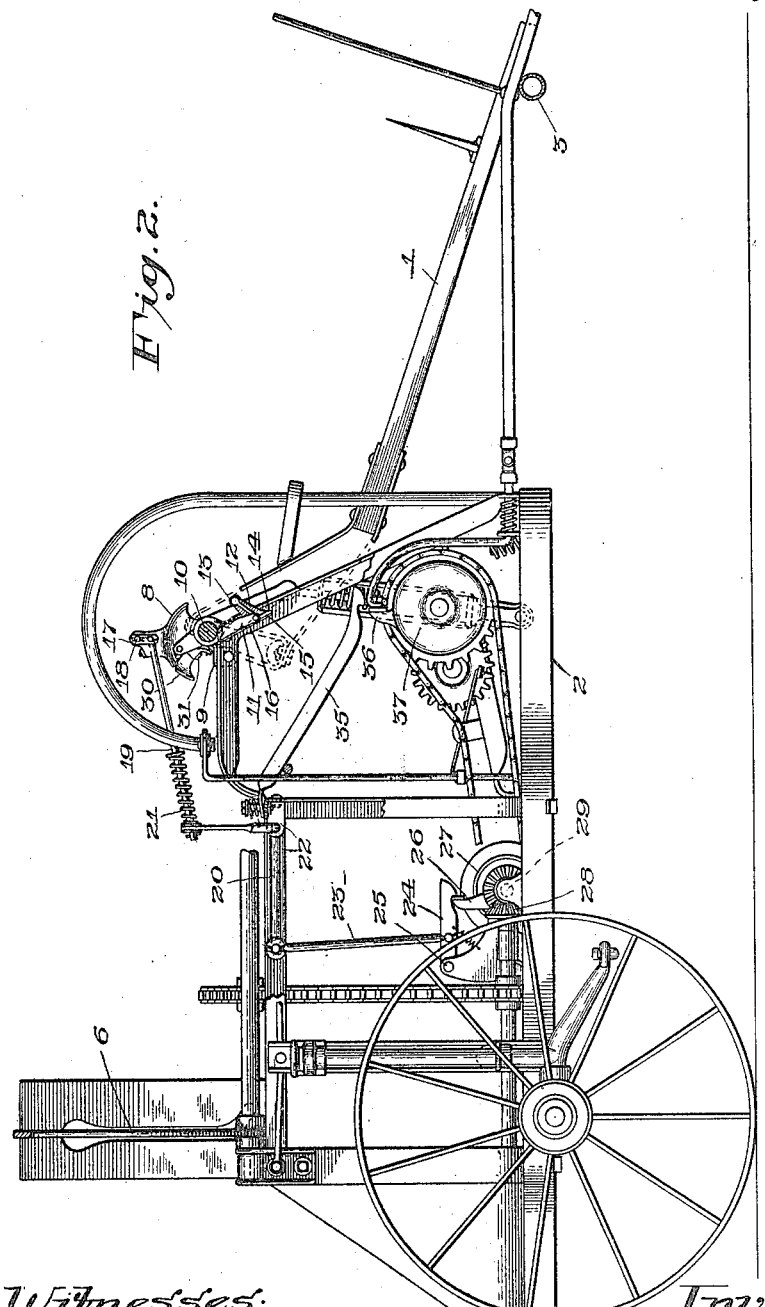

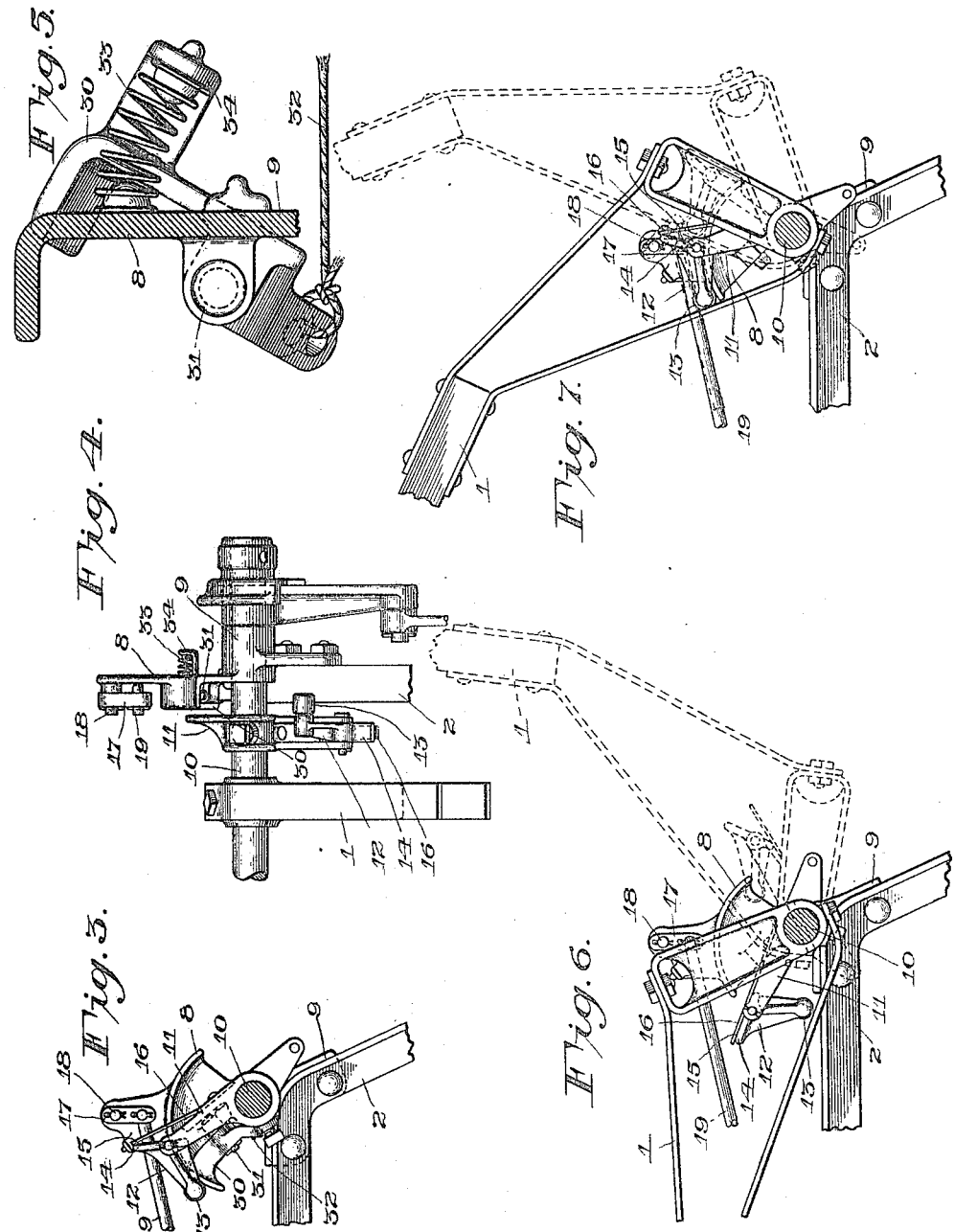

UNITED STATES PATENT OFFICE.

CLEMMA R. RANEY, OF CHICAGO, ILLINOIS, ASSIGNOR TO INTERNATIONAL HARVESTER COMPANY OF NEW JERSEY, A CORPORATION OF NEW JERSEY.

SHOCKING-MACHINE.

1,231,195.      Specification of Letters Patent.      Patented June 26, 1917.

Application filed January 23, 1913. Serial No. 743,740.

*To all whom it may concern:*

Be it known that I, CLEMMA R. RANEY, a citizen of the United States, residing at Chicago, in the county of Cook and State of Illinois, have invented certain new and useful Improvements in Shocking-Machines, of which the following is a full, clear, and exact specification.

My invention relates to shocking machines. My invention has among its objects to improve the controlling mechanism of a shocker, and especially the size control mechanism thereof. A more specific object of my invention is to provide an improved size control mechanism especially adapted to use in connection with a shocker having a movable sheaf delivery member, wherein the range and sensitiveness of control of the mechanism is materially increased at the same time that the mechanism itself is simplified and rendered more rugged and adapted to service under a wider range of conditions. I attain these objects by an improved construction, wherein the sheaf delivery member acts as the controlling member for the size control mechanism and, as a result of its engagement with the surface of the shock when the latter has reached a predetermined size, trips off the shock binding and discharging mechanism.

In the accompanying drawings I have, for purposes of illustration, shown one embodiment which my invention may assume in practice.

Fig. 2 is a side elevation of the same when turned in the opposite direction;

Fig. 3 is a detail of a portion of the mechanism controlling the shock discharging mechanism;

Fig. 4 is an end elevation of the same with coöperating mechanism;

Fig. 5 is a detail view of a portion of the mechanism shown in Fig. 3;

Fig. 6 is a detail view showing the sheaf delivering arm and the mechanism in Fig. 3 in a plurality of positions;

Fig. 7 is a view similar to Fig. 6 showing the parts in other positions.

Figure 1:
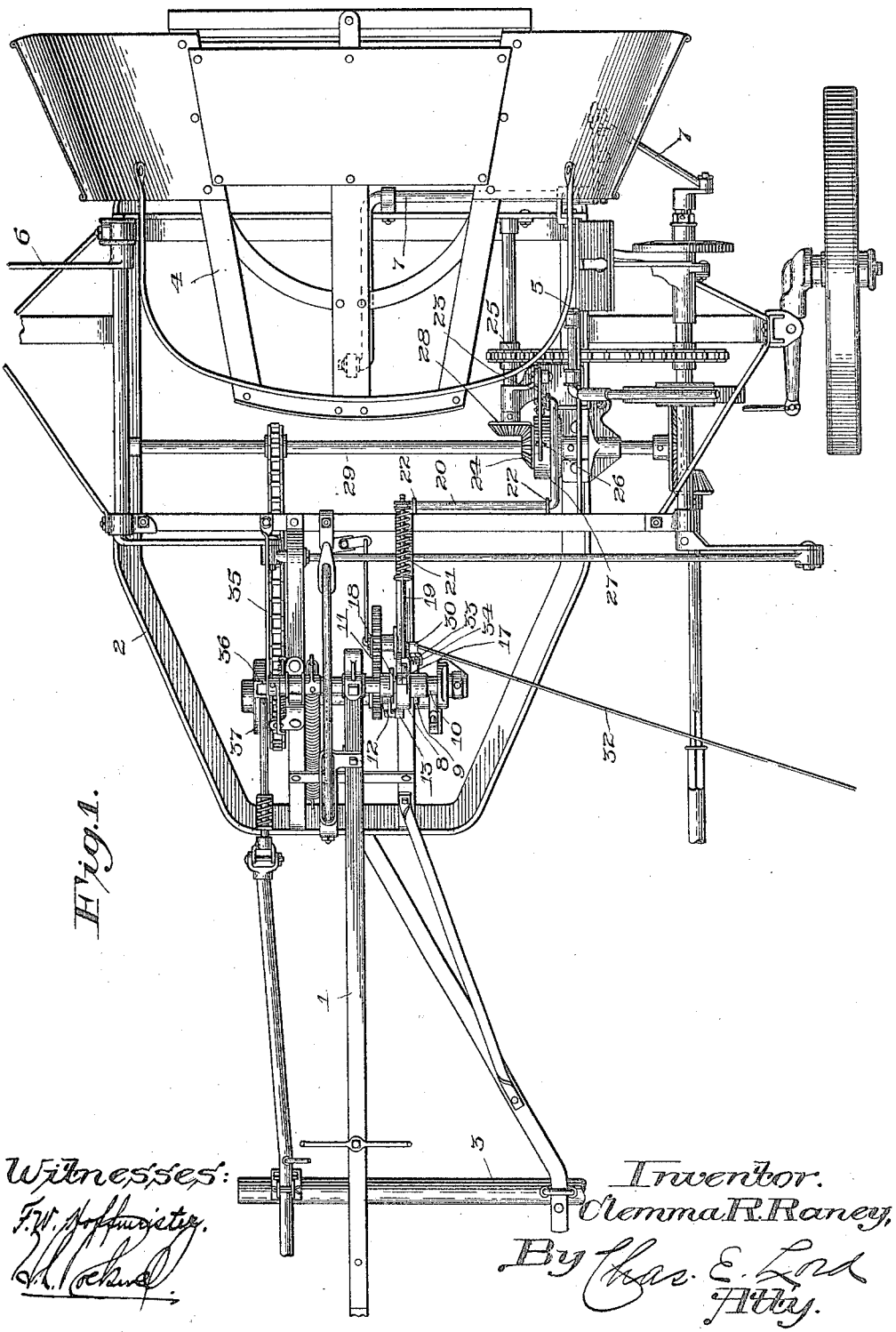
Figure 1 is a top plan view of the shocker.

The shocker shown is of the type described and claimed in my copending application, Serial No. 573,106, filed July 21, 1910, wherein a sheaf delivering fork 1 is pivotally mounted upon the shocker frame 2 and operated by suitable operating mechanism, controlled by the sheaves delivered thereto, to move back and forth through an arc, from its sheaf receiving position, upon an arm 3 extending from the harvester frame, to sheaf delivering position wherein the tines thereof are driven teeth downward into a pivoted sheaf receiving cradle 4 normally reclining on the rear end of the frame 2. Coöperating with this sheaf delivering mechanism and controlled thereby is automatic mechanism actuating a compressor arm 5 and a binding needle 6 at a predetermined time to compress and bind a shock in the cradle 4, while coöperating with this binding and compressing mechanism is suitable shock discharging mechanism 7 operable to turn the cradle 4 about its pivot on the frame 2 and thus discharge the bound shock.

I have provided improved means, coöperating with the sheaf delivering mechanism and operable thereby, controlling the shock binding, compressing and discharging mechanism in an improved manner. These means include a cam member 8 carried by a bracket 9 in which the rotatable sheaf delivery shaft 10 is journaled. This cam is substantially arc-shaped, and as shown, is slightly eccentric with respect to the shaft and provided with an overturned or laterally extending flange at one side thereof which protrudes toward the movable arm 1. Intermediate this cam 8 and the arm 1 a coöperating cam member and tripping member 11 is provided, which is rigidly attached to the shaft 10 and rotatable with the same and the arm 1. This coöperating cam member 11 is shown in detail in Figs. 3, 4, 6, and 7, and comprises a laterally extending arm having a substantially bell-crank shaped member 12 pivoted at its end. This latter member is provided at one end with a rounded knob or roller 13, and at its opposite end with a lug 14 flattened upon one of its faces as at 15. The bell crank member 12 is normally held in a predetermined position with respect to the member 11 by means of a flat spring 16 fixed at one end of said member, the normal position of the member 12 being shown in Fig. 6, wherein the free end of the spring rests against the flat surface 15 thereof. When the arm 1 is moved toward sheaf discharging position, the same is brought upward and backward about its pivot in the bearings of the shaft 10. During this movement, the pivoted member 12 is thrown back about its pivot to compress the spring 16 and rides over the upper surface of the cam 8, as shown in Fig. 7. When, however, the front end of the member 12 passes over the end of the cam 8 the spring 16 is automatically relieved so that it is free to throw the bell crank 12 forward about its pivot into such a position that when the arm 1 is moved backward, i. e., to sheaf receiving position, the roller 13 rides over the under surface of the cam 8 as shown in Fig. 6. Thus, when the arm 1 is moved back and forth in the normal operation of filling the sheaf receiving cradle 4, the bell crank 12 moves therewith riding over the upper surface of the cam 8 when the arm 1 is moved toward sheaf discharging position, and engaging with the under surface of the cam when the sheaf delivering arm 1 is returned to sheaf receiving position. Coöperating with the movable member 12 and actuated by the latter in its movement along the cam 8 is a tripping member 17 pivoted at 18 to a vertically extending lug formed upon the bracket 9 above the cam 8, in such a position that it is in the path of the bell crank 12 as the same is moved forward or backward on the upper surface of the cam 8. This tripping member 17 is pivotally connected through a link 19 with a crank 20 and a coiled spring 21 is provided between the last two members to take up the movement of the trip as the bell crank 12 is moved rearward, and automatically return the tripping member 17 to normal position. The crank 20 is pivoted at 22 to a portion of the frame 2 and is provided with a downwardly extending link 23 pivotally connected at its lower end to a pawl or catch 24 pivoted at 25 to the frame 2 and normally engaging the clutch controlling finger 26 of a clutch 27 controlling the connection of a gear 28 to the power shaft 29, and through the latter, the operation of the compressing, binding and dumping mechanism.

In order that the sheaves in the cradle may be dumped at any desired time regardless of the number or height of sheaves therein, as for instance, when the machine nears the end of the field, or when it is making a turn, I provide improved mechanism under control of the operator which is operable to actuate the automatic mechanism hereinbefore described at any time desired. This mechanism includes a pivoted cam extension 30 pivoted at 31 at one side of the cam 8 and of substantially the same conformation as the latter, which, when thrown into the operative position as shown in Fig. 3, forms an extension of said cam. As illustrated, this member is operable through a suitable cord or link 32 extending to a point adjacent the operator's seat, and is automatically returned to its retracted position by a coiled spring 33 which extends between a projection 34 formed on the member 30 and a portion of the back of the bracket 9, and normally tends to hold the member 30 in the full line position shown in Fig. 5, wherein it is held out of the path of the bell crank lever 12.

The sheaf compressing, binding and discharging mechanisms shown are of substantially the same construction as those described in my co-pending application mentioned above, all of these mechanisms being operated in the sequence named when the gear 28 is connected to the power shaft 29. Inasmuch as the specific construction of these mechanisms per se does not form a part of this invention, a specific description of the same has been omitted herein in order to simplify the consideration of this case. For the same reason, a specific description of the operating and controlling mechanism for the sheaf delivery mechanism has been omitted. It is to be understood, however, that the mechanism shown herein is adapted to coöperate with these mechanisms in substantially the same way as that described in the above mentioned application. For example, when the connections to the binding needle 6 are operated they act to disconnect automatically the sheaf delivering member from the source of power by means of a spring pressed member 35 which engages with a controlling finger 36 of the clutch 37 at that time. Obviously, however, the improved mechanism shown herein may be used in connection with other means for operating and controlling the sheaf delivery member and for operating and controlling the compressing, binding and discharging mechanism or with other mechanisms than those described in that application.

The operation of the construction shown is as follows: When the sheaf delivering arm 1 is rotated about its pivot upon the shaft 10, from sheaf receiving position to sheaf discharging position, the roller 13 of the bell crank 12 moves over the upper surface of the cam 8, the parts taking the positions shown in Fig. 7 during the progress of the arm toward sheaf discharging position. The roller 13 on the bell crank 12 during the course of this movement, strikes the tripping arm 17, but does not trip the catch 24 because of the provision of the spring 21. When the arm 1 is returned to sheaf receiving position the bell crank 12 moves backward therewith engaging the under surface of the cam 8. This action continues during the entire operation of filling the cradle 4, the member 12 alternately riding over and under the cam 8. When, however, the cradle is so filled that the arm 1 in its sheaf discharging position strikes the sheaves and is so held up thereby that the bell crank 12 can not pass underneath the cam 8, the return of the arm 1 to sheaf receiving position brings the roller 13 of the bell crank 12 back under the trip 17, causing the latter to be moved backward. When this occurs the arm 19 is moved backward, oscillating the crank 20 and raising the link 23 and catch 24 to cause the clutch 27 to lock the gear 28 to the power shaft 29 and operate the shock compressing, binding and discharging mechanism.

When for any reason it is desired to discharge the bundles from the cradle before the latter is completely filled, as, for instance, at the end of the field or in lining up the shocks in the field, the operator pulls the cord 32 to throw the pivoted cam extension 30 about its pivot 31 so that the active surface thereof forms a continuation of the cam 8, as shown in Fig. 3. Inasmuch as the arm 1 in its sheaf discharging position can not carry the bell crank 12 through a sufficient arc to pass over the end of the cam 8 when thus extended, the bell crank 12, in moving back with the arm 1, instead of engaging the under surface of the cam, rides back over the upper surface thereof, and trips the tripping member 17 to actuate the shock compressing, binding and discharging mechanism, as hereinbefore described.

In the operation of my improved mechanism it will be observed that the sheaf delivery or controlling member engages not with one small part only of the shock but with practically the whole upper surface thereof. Attention is also directed to the fact that by the use of the sheaf delivery member as the controlling member, I am enabled to engage the upper surface of the butts of the sheaves in the upper layers of the shock so that when the butts are heavy and the heads are light, the shock setting mechanism is always tripped off before the load of butts becomes too heavy to handle, this action taking place whenever the resistance of the shock to the impact of the delivery member reaches a certain amount. Special attention is also directed to the fact that the operation of the shock binding and setting mechanism is expedited, since the sheaf delivery member may trip off this mechanism as it returns from delivering a sheaf to either side of the receptacle, the binding and dumping of the shock of course not being interfered with by the delivery member since the latter is then moving backward to its sheaf receiving position.

It is also to be noted that while the tripping mechanism is not operated during the operation of filling the cradle, it is at all times under the control of the operator so that it may be actuated to bind and discharge any number of sheaves from the cradle whenever desired. Further, it is to be noted that by making the compressing, binding and discharging mechanism directly controlled by the sheaf delivery arm, the construction is greatly simplified at the same time that it is made possible to get the very desirable feature of height control without necessitating placing any parts over or in the path of the movable shock receptacle, former or container. Attention is further directed to the fact that the sheaf delivery mechanism is also placed under the control of the operator in an improved manner through the provision of improved and simplified mechanism whereby it may be rendered inoperative at any desired time.

While I have described one embodiment of my invention in this application, it is, of course, to be understood that the embodiment shown herein is susceptible of modification without departing from the spirit of my invention.

What I claim as my invention, and desire to secure by Letters Patent is:

1. In a shocking machine, normally prostrate shock setting mechanism, and a sheaf delivery member controlling the same and engageable with the upper surface of the shock butt therein.

2. In a shocking machine, a prostrate shock receptacle, and means for operating the same having a controlling member engageable with the entire upper surface of a sheaf deposited therein.

3. In a shocking machine, a shock receptacle, shock discharging mechanism, and intermittently operating controlling means therefor successively engageable with different parts of the shock.

4. In a shocking machine, a shock receptacle, shock binding mechanism, and controlling means therefor including a controlling member engageable with the sheaves in the shock substantially throughout their length.

5. In a shocking machine, a shock receptacle, shock binding mechanism, and controlling means for the latter successively engageable with the butts of sheaves on opposite sides of the shock.

6. In a shocking machine, a shock receptacle, shock discharging mechanism, and controlling means therefor including a controlling and shock building member engageable with the sheaves in the shock substantially throughout their length.

7. In a shocking machine, a normally prostrate shock receptacle, operating mechanism therefor, and controlling means successively engageable with the upper surface of sheaf butts lying on opposite sides of said receptacle.

8. In a shocking machine, a shock former, operating mechanism therefor including a trip, and a sheaf delivery member engageable with the surface of the shock in said former and with said trip when said surface protrudes beyond a certain point.

9. In a shocking machine, a shock receptacle, dumping mechanism therefor, and mechanism for delivering sheaves to opposite sides of said receptacle setting said dumping mechanism in operation after delivering a sheaf to either side of said receptacle when the shock has reached a predetermined size.

10. In a shocking machine, a shock receptacle, shock binding mechanism, and mechanism for delivering sheaves to opposite sides of said receptacle setting said shock binding mechanism in operation after delivering a sheaf to either side of said receptacle when the shock has reached a predetermined size.

11. In a shocking machine, shock discharging mechanism including a trip, and a combined sheaf delivery and discharge controlling member movable back and forth and engageable with said trip to set said mechanism in operation as it returns from delivering a sheaf to a shock of predetermined size.

12. In a shocking machine, a prostrate shock receptacle, shock discharging mechanism, and means building a prostrate shock in said receptacle and engageable with the butts of the upper layer of sheaves therein controlling said discharging mechanism and setting it in operation when the shock butt has reached a predetermined height.

13. In a shocking machine, a shock receptacle, shock binding mechanism, and means building a shock in said receptacle and engageable with the opposite sides of one surface of the shock, setting said binding mechanism in operation when the shock butt has reached a predetermined size.

14. In a shocking machine, a normally prostrate shock receptacle, shock discharging mechanism, and means building a shock in said receptacle and engageable with the opposite sides of the upper surface of the prostrate shock, setting said discharging mechanism in operation when the shock butt has reached a predetermined size.

15. In a shocking machine, a shock receptacle, delivery mechanism delivering sheaves thereto, shock binding mechanism, and controlling means for the latter setting it in operation when the shock built by said delivery mechanism has developed a predetermined resistance to movement of the delivery mechanism in one direction.

16. In a shocking machine, a shock receptacle, means including a swinging sheaf delivery member for building a shock therein, shock binding mechanism, and means for setting the latter in operation when the bulk of the shock restricts the delivery movement of said member to a predetermined degree.

17. In a shocking machine, a shock building member movable back and forth through a path of gradually decreasing length as it builds a shock, and means controlled by said member for discharging a shock built thereby when said shock has reached a predetermined size.

18. In a shocking machine, a shock building member movable back and forth through a path of gradually decreasing length as it builds a shock, and means controlled by said member for binding a shock built thereby when said shock has reached a predetermined size.

19. In a shocking machine, a shock building member movable back and forth through a path of gradually decreasing length as it builds a shock, and means controlled by said member for binding and discharging a shock built thereby when said shock has reached a predetermined size.

20. In a shocking machine, a shock building member movable back and forth through a path of gradually decreasing length, shock discharging mechanism, and controlling mechanism for the latter actuated by said member when the shock has reached a predetermined size.

21. In a shocking machine, a shock building member movable back and forth through an arc of gradually decreasing amplitude as it builds a shock, and means controlled by said member for discharging a shock built thereby when said shock has reached a predetermined size.

22. In a shocking machine, a shock building member movable back and forth through an arc of gradually decreasing amplitude as it builds a shock, and means controlled by said member for binding a shock built thereby when the shock has reached a predetermined size.

23. In a shocking machine, a shock building member movable back and forth through an arc of gradually decreasing amplitude as it builds a shock, and means controlled by said member for binding and discharging a shock built thereby when the shock has reached a predetermined size.

24. In a shocking machine, a shock building member movable back and forth through an arc of gradually decreasing amplitude, shock discharging mechanism, and controlling mechanism for the latter actuated by said shock building member when the shock has reached a predetermined size.

25. In a shocking machine, a swinging shock building member, shock discharging mechanism, and controlling mechanism for the latter engaged and actuated by said shock building member when the shock has reached a predetermined size.

26. In a shocking machine, a swinging shock building member, shock binding mechanism, and controlling mechanism for the latter engaged and actuated by said shock building member when the shock has reached a predetermined size.

27. In a shocking machine, a swinging shock building member, shock binding and discharging mechanism, and controlling mechanism for the latter engaged and actuated by said shock building member when the shock has reached a predetermined size.

28. In a shocking machine, a shock receptacle, shock discharging mechanism, controlling mechanism therefor, and a movable shock building member engaging and actuating said controlling mechanism when the shock built by said member has reached a predetermined size.

29. In a shocking machine, a shock receptacle, shock binding mechanism, controlling mechanism therefor, and a movable shock building member engaging and actuating said controlling mechanism when the shock built by said member has reached a predetermined size.

30. In a shocking machine, a shock receptacle, shock binding and discharging mechanism, controlling mechanism therefor, and a movable shock building member engaging and actuating said controlling mechanism when the shock built by said member has reached a predetermined size.

31. In a shocking machine, a shock receptacle, shock compressing, binding and discharging mechanism, controlling mechanism therefor, and a movable shock building member engaging and actuating said controlling mechanism when the shock built by said member has reached a predetermined size.

32. In a shocking machine, a shock receptacle, shock discharging mechanism including a trip member, and mechanism including a swinging shock building member building a prostrate shock in said receptacle, said member engaging and actuating the trip member of said discharging mechanism when the shock has reached a predetermined size.

33. In a shocking machine, a shock receptacle, shock binding mechanism including a trip member, and mechanism including a swinging shock building member building a prostrate shock in said shock receptacle, said member engaging and actuating the trip member of said binding mechanism when the shock has reached a predetermined size.

34. In a shocking machine, a shock receptacle, shock binding and discharging mechanism including a trip member, and mechanism including a swinging shock building member building a prostrate shock in said shock receptacle, said member engaging and actuating the trip member of said binding and discharging mechanism when the shock has reached a predetermined size.

35. In a shocking machine, a sheaf receiving cradle, mechanism including a trip member for discharging the sheaves therein in the form of a shock, and a sheaf delivering member movable in a substantially upright plane in a fore and aft direction engageable with said trip member and setting said mechanism in operation when the sheaves in said cradle have reached a predetermined volume.

36. In a shocking machine, a sheaf receiving cradle, mechanism including a trip member for binding the sheaves therein in the form of a shock, and a sheaf delivering member movable in a substantially upright plane in a fore and aft direction engageable with said trip member and setting said mechanism in operation when the sheaves in said cradle have reached a predetermined bulk.

37. In a shocking machine, a sheaf receiving cradle, mechanism including a trip member for binding and discharging the sheaves therein in the form of a shock, and a sheaf delivering member movable in a substantially upright plane in a fore and aft direction engageable with said trip member and setting said mechanism in operation when the sheaves in said cradle have reached a predetermined bulk.

38. In a shocking machine, a dumping sheaf receiving cradle, a sheaf delivering member coöperating therewith, and mechanism engaged by said sheaf delivering member when the shock has reached a predetermined size controlling the operation of said sheaf receiving cradle.

39. In a shocking machine, a shock receptacle, sheaf delivery mechanism including a movable sheaf delivering member, automatic mechanism controlled by said delivery mechanism for binding into the form of a shock the sheaves delivered thereby, and additional means controlling the operation of said delivery mechanism and the binding of said shock.

40. In a shocking machine, a shock receptacle, sheaf delivery mechanism including a movable sheaf delivering member, automatic mechanism controlled by said delivery mechanism for discharging at intervals in the form of a shock a plurality of sheaves delivered thereby, and additional means controlling the operation of said delivery mechanism and the binding of said shock.

41. In a shocking machine, a shock receptacle, sheaf delivery mechanism including a movable sheaf delivering member, automatic mechanism controlled by said delivery mechanism for binding and discharging at intervals in the form of a shock a plurality of sheaves delivered thereby, and additional means controlling the operation of said delivery mechanism and the binding and discharging of said shock.

42. In a shocking machine, a shock receptacle, sheaf delivery mechanism including a movable sheaf delivering member, mechanism for binding and discharging at intervals in the form of a shock a plurality of sheaves delivered thereby, and means actuated by said sheaf delivering member and under the manual control of the operator controlling the operation of said mechanisms.

43. In a shocking machine, a shock receptacle, a movable sheaf delivering member, mechanism for binding and discharging at intervals in the form of a shock a plurality of sheaves delivered thereby, and a tripping member operatively connected to and controlling the operation of said mechanism engaged and actuated by said sheaf delivering member when the shock has reached a predetermined size.

44. In a shocking machine, a normally prostrate sheaf receiving cradle, a sheaf delivering member coöperating therewith, mechanism for binding and discharging sheaves in said cradle, and means engaged and actuated by said sheaf delivering member when the sheaves in said cradle have reached a predetermined height controlling the operation of said mechanism.

45. In a shocking machine, a movable sheaf delivering member, a sheaf receiving cradle coöperating therewith, and mechanism engaged and actuated by said sheaf delivering member and controlled by the bulk of the sheaves in said cradle for discharging the sheaves therefrom.

46. In a shocking machine, a movable sheaf delivering member, a sheaf receiving cradle coöperating therewith, and means inoperative during the filling of said cradle engaged and actuated by said sheaf delivering member when the sheaves therein have reached a predetermined bulk to discharge said sheaves.

47. In a shocking machine, movable sheaf delivery mechanism including a sheaf delivering member, a sheaf receiving cradle, mechanism for compressing, binding and discharging the sheaves delivered to said cradle by said member, and means actuated by said sheaf delivering member when the sheaves in said cradle have reached a predetermined bulk and as said member moves backwardly from delivering a sheaf controlling said compressing, binding and discharging mechanism.

48. In a shocking machine, movable sheaf delivery mechanism including a sheaf delivering member, a dumping sheaf receiving cradle receiving sheaves therefrom, means actuated by said sheaf delivering member at a predetermined time controlling the operation of said cradle, and means for rendering said cradle operable at any desired time except when said delivering member is delivering a sheaf thereto.

49. In a shocking machine, movable sheaf delivery mechanism including a sheaf delivering member, a dumping sheaf receiving cradle receiving sheaves therefrom, means actuated by said sheaf delivering member at a predetermined time controlling the operation of said cradle, and supplemental manually controlled means for rendering said cradle operable at any desired time except when said delivering mechanism is delivering a sheaf.

50. In a shocking machine, a movable sheaf delivering member, a dumping sheaf receiving cradle receiving sheaves therefrom, and means for discharging in the form of a shock the sheaves in said cradle engaged and actuated by said sheaf delivery member when said sheaves have reached a predetermined bulk.

51. In a shocking machine, a movable sheaf delivering member, a dumping sheaf receiving cradle receiving sheaves therefrom, means for binding and discharging in the form of a shock the sheaves in said cradle engaged and actuated by said sheaf delivering member when the sheaves in said cradle have reached a predetermined height, and means coöperating with said last mentioned means rendering the cradle operable at any desired time.

52. In a shocking machine, a frame, a sheaf delivering member movable with respect thereto, a cam fixed to said frame, a cam engaging rider movable with said sheaf delivering member and normally passing in one direction over said cam, and tripping mechanism actuated by said rider upon the reversal of the direction of movement thereof.

53. In a shocking machine, a frame, a sheaf delivering member pivoted thereon, a cam fixed to said frame, a cam engaging member normally movable with said sheaf delivering member in one direction over said cam, and means actuated by said cam engaging member upon the reversal of movement of said sheaf delivering member binding the sheaves delivered thereby.

54. In a shocking machine, a frame, a sheaf delivering member pivoted thereon, a cam member fixed to said frame, a cam engaging member movable with said sheaf delivering member in one direction over said cam, a tripping member adjacent said cam and operable by said cam engaging member upon a reversal of movement of said sheaf delivering member, and mechanism controlled by said tripping member discharging the sheaves delivered by said sheaf delivering member.

55. In a shocking machine, a frame, a movable sheaf delivering member carried on said frame, a cam fixed to said frame, a cam engaging member movable with said member and normally riding back and forth upon the upper and lower surfaces of said cam, a sheaf receiving cradle, receiving sheaves from said delivering member, and means actuated by said cam engaging member when the sheaves in said cradle have reached a predetermined height discharging the sheaves from said cradle.

56. In a shocking machine, a frame, a shaft journaled thereon, a cam member fixed to said frame, a pivoted sheaf delivering member movable with said shaft, a cam engaging member carried by said shaft and normally riding back and forth with said sheaf delivering member and alternately engaging the upper and lower surfaces of said cam, and a tripping member actuated by said cam engaging member when the sheaves delivered by said sheaf delivery member have reached a predetermined volume.

57. In a shocking machine, a frame, a cam member carried thereby, a member relatively movable with respect to said cam, means movable with said member normally riding over said cam in one direction, a trip actuated by said last mentioned means upon a reversal of the movement of the latter, and means for reversing the direction of movement of said first mentioned member at any desired time.

58. In a shocking machine, a frame, a shaft journaled thereon, a movable sheaf delivering member rotatable with said shaft, mechanism for rotating said shaft, a cam fixed to said frame, a rider movable with said shaft and delivery member and normally riding in one direction over said cam, a normally inoperative tripping member adjacent said cam, and in the path of said rider and means operable at a predetermined time to reverse the direction of movement of said rider and thereby actuate said tripping member.

59. In a shocking machine, a frame, a swinging sheaf delivery member journaled thereon, a cam disposed about the axis of said delivery member, a tripping member disposed adjacent said cam, means on said sheaf delivery member engageable with said tripping member, and a cam extension carried on said frame and movable into position to form a continuation of said cam.

60. In a shocking machine, a frame, a swinging sheaf delivery member journaled thereon, a cam disposed about the axis of said delivery member, a tripping member disposed adjacent said cam, means on said sheaf delivery member engageable with said tripping member, and a normally inoperative cam extension carried on said frame and movable into position to form a continuation of said cam.

61. In a shocking machine, a frame, a sheaf delivery member journaled thereon, a cam disposed about the axis of said delivery member, a tripping member pivoted on said frame and disposed adjacent the surface of said cam, a member pivoted on said sheaf delivery member and engageable with the surface of said cam and with said tripping member, and resilient means normally holding said pivoted member in a predetermined position.

62. In a shocking machine, a frame, a sheaf delivery member journaled thereon, a cam disposed about the axis of said delivery member, a tripping member pivoted on said frame and disposed adjacent the surface of said cam, a bell crank member pivotally connected to said sheaf delivery member and engageable with said cam and strip, and a spring normally maintaining said bell crank in a predetermined position.

63. In a shocking machine, a frame, a sheaf delivery member journaled thereon, a tripping member carried on said frame disposed in the path of said sheaf delivery member and engageable thereby, a link pivotally connected to said trip, a clutch controlling member journaled on said frame, and a connection between said link and said clutch controlling member.

64. In a shocking machine, a frame, a sheaf delivery member journaled thereon, a tripping member disposed in the path of said sheaf delivery member and engageable thereby, a link pivotally connected to said trip, a clutch controlling member journaled on said frame, and means including a compressible resilient connection between said link and said clutch controlling member whereby said clutch controlling member is only operated by the engagement of said delivery member with said trip when said delivery member is moved in one direction.

65. In a shocking machine, a frame, a movable sheaf delivery member journaled thereon, a trip carried on said frame and disposed in the path of movement of said delivery member, a crank member journaled on said frame, a clutch carried on said frame, operative connections between one end of said crank member and said trip, and operative connections between the other end of said crank member and said clutch.

66. In a shocking machine, a frame, a swinging sheaf delivery member pivoted on said frame, a shock receptacle carried on said frame receiving sheaves delivered thereby, mechanism including a clutch for discharging the sheaves in said receptacle, and controlling mechanism for said last mentioned mechanism including a trip disposed in the path of said sheaf delivery member and operatively connected to said clutch.

67. In a shocking machine, a frame, a swinging sheaf delivery member pivoted on said frame, a shock receptacle carried on said frame receiving sheaves delivered thereby, mechanism including a clutch for discharging the sheaves in said receptacle, and controlling mechanism for said last mentioned mechanism including a trip disposed in the path of said sheaf delivery member and carried on said frame at a point adjacent the pivot of said member operatively connected to said clutch.

68. In a shocking machine, a frame, a swinging sheaf delivery member pivoted on said frame, a shock receptacle carried on said frame receiving sheaves delivered thereby, mechanism including a clutch for discharging the sheaves in said receptacle, a trip disposed in the path of said sheaf delivery member and carried on said frame at a point adjacent the pivot of said member operatively connected to said clutch, and link connections operatively connecting said trip and said clutch.

69. In a shocking machine, a frame, a swinging sheaf delivery member pivotally mounted thereon, a shock receptacle carried on said frame and receiving sheaves delivered by said delivery member, mechanism for discharging a shock from said receptacle including a clutch carried on said frame, and controlling mechanism operatively connected to said clutch carried on said frame adjacent the pivot of said sheaf delivery member and engageable by the latter as it delivers each sheaf to said receptacle, said controlling mechanism being actuatable by said member when the sheaves in said receptacle have reached a predetermined bulk.

70. In a shocking machine, a frame, a sheaf receiving cradle normally reclining thereon, a shaft journaled transversely of said frame in front of said cradle, a swinging sheaf delivery member movable in a substantially upright plane carried on said shaft and delivering sheaves in prostrate position in said cradle, an arcuate cam fixed to said frame adjacent said shaft, a rider movable with said delivery member normally riding over said cam in one direction as a shock is built in said cradle, means for reversing the direction of movement of said delivery member and rider when the shock in said cradle has reached a predetermined size, and means actuated upon such reversal of movement for binding into a shock the sheaves then in the cradle.

71. In a shocking machine, a frame, a sheaf receiving cradle normally reclining thereon, a shaft journaled transversely of said frame in front of said cradle, a swinging sheaf delivery member movable in a substantially upright plane carried on said shaft and delivering sheaves in prostrate position in said cradle, an eccentrically disposed arcuate cam fixed to said frame adjacent said shaft, a rider movable with said delivery member normally riding over said cam in one direction as a shock is built in said cradle, means for reversing the direction of movement of said delivery member and rider when the shock in said cradle has reached a predetermined height, and means actuated upon such reversal of movement for discharging in the form of a shock the sheaves then in said cradle.

72. In a shocking machine, a frame, a rotatable shaft journaled thereon, a sheaf delivering member movable with said shaft and swinging back and forth as it delivers a sheaf, a sheaf receiving cradle carried by said frame and receiving sheaves delivered by said delivering member, an arc shaped cam fixed to said frame adjacent the axis of said shaft, a rider movable with said sheaf delivering member normally riding back and forth therewith and alternately engaging opposite surfaces of said cam as said sheaf delivering member moves back and forth in delivering a sheaf, means for moving said rider backward over the same surface of said cam when the sheaves in said cradle have reached a predetermined height, mechanism for binding into a shock the sheaves in said cradle, and a tripping member controlling said binding mechanism actuated by said rider in such backward movement.

73. In a shocking machine, a frame, a rotatable shaft journaled thereon, a sheaf delivering member movable with said shaft and swinging back and forth as it delivers a sheaf, a sheaf receiving cradle carried at the rear of said frame receiving sheaves delivered by said sheaf delivering member, a laterally extending arc-shaped cam fixed to said frame at one side of said delivery member and disposed eccentrically with respect to the axis of said shaft, a rider movable back and forth with said sheaf delivering member and alternately engaging opposite surfaces of said cam, mechanism for moving said rider backward over the same surface of said cam when the sheaves in said cradle have reached a predetermined height, mechanism for discharging in the form of a shock the sheaves delivered to said cradle, and a normally inoperative tripping member controlling said discharging mechanism actuated by said rider during its backward movement.

74. In a shocking machine, a frame, a rotatable shaft journaled thereon, a sheaf delivering member movable with said shaft and swinging back and forth as it delivers a sheaf, a sheaf receiving cradle carried by said frame and receiving sheaves delivered by said delivering member, an arc shaped cam fixed to said frame adjacent the axis of said shaft, a rider movable with said sheaf delivering member normally riding back and forth therewith and alternately engaging opposite surfaces of said cam as said sheaf delivering member moves back and forth in delivering a sheaf, means for moving said rider backward over the same surface of said cam when the sheaves in said cradle have reached a predetermined height, mechanism for binding into a shock the sheaves in said cradle, a tripping member controlling said binding mechanism actuated by said rider in its backward movement, and supplemental means for rendering said binding mechanism operable at any desired time.

75. In a shocking machine, a frame, a rotatable shaft journaled thereon, a sheaf delivering member movable with said shaft and swinging back and forth as it delivers a sheaf, a sheaf receiving cradle carried at the rear of said frame receiving sheaves delivered by said sheaf delivering member, a laterally extending arc shaped cam fixed to said frame at one side of said delivering member and disposed eccentrically with respect to the axis of said shaft, a rider movable back and forth with said sheaf delivering member and alternately engaging opposite surfaces of said cam, mechanism for moving said rider backward over the same surface of said cam when the sheaves in said cradle have reached a predetermined height, mechanism for discharging in the form of a shock the sheaves delivered to said cradle, a normally inoperative tripping member controlling said discharging mechanism actuated by said rider during its backward movement, and supplemental means rendering said discharging mechanism operable at any desired time.

76. In a shocking machine, a shock receptacle, sheaf delivery mechanism including a movable sheaf delivering member, automatic mechanism controlled by said delivering member for binding into the form of a shock the sheaves delivered thereby, and independent manually operable means controlling the operation of said delivery mechanism and the binding of said shock.

In testimony whereof I affix my signature, in the presence of two witnesses.

CLEMMA R. RANEY.

Witnesses:
RAY PATTESON,
RAY D. LEE.

Copies of this patent may be obtained for five cents each, by addressing the "Commissioner of Patents, Washington, D. C."